US008498412B2

(12) United States Patent
Wajs

(10) Patent No.: US 8,498,412 B2
(45) Date of Patent: Jul. 30, 2013

(54) METHOD OF PROVIDING AN ENCRYPTED DATA STREAM

(75) Inventor: Andrew Augustine Wajs, Haarlem (NL)

(73) Assignee: Irdeto B.V. (NL)

( * ) Notice: Subject to any disclaimer, the term of this patent is extended or adjusted under 35 U.S.C. 154(b) by 1009 days.

(21) Appl. No.: 11/726,109

(22) Filed: Mar. 21, 2007

(65) Prior Publication Data

US 2007/0258583 A1  Nov. 8, 2007
US 2009/0067621 A9  Mar. 12, 2009

(30) Foreign Application Priority Data

Mar. 21, 2006 (EP) .................................... 06111465

(51) Int. Cl.
*H04L 29/06* (2006.01)

(52) U.S. Cl.
USPC ............. 380/223; 380/42; 380/277; 380/210; 725/31

(58) Field of Classification Search
USPC ................. 380/42, 277, 210, 223; 725/31
See application file for complete search history.

(56) References Cited

U.S. PATENT DOCUMENTS

| 7,975,280 | B2 * | 7/2011 | Bertram ........................... 725/31 |
| 2002/0168963 | A1 * | 11/2002 | Wajs ............................ 455/411 |
| 2004/0083177 | A1 | 4/2004 | Chen et al. |
| 2004/0268387 | A1 * | 12/2004 | Wendling ........................ 725/35 |
| 2005/0089170 | A1 * | 4/2005 | Wachtfogel et al. .......... 380/268 |
| 2005/0198680 | A1 * | 9/2005 | Baran et al. ..................... 725/88 |
| 2006/0285686 | A1 * | 12/2006 | Van Den Heuvel et al. .. 380/200 |

(Continued)

FOREIGN PATENT DOCUMENTS

| EP | 1063647 A2 | 12/2000 |
| EP | 1111924 A1 | 6/2001 |

(Continued)

OTHER PUBLICATIONS

"European Application Serial No. 06111465.8, European Search Report mailed Jun. 15, 2011", 3 pgs.

(Continued)

*Primary Examiner* — Michael Pyzocha
(74) *Attorney, Agent, or Firm* — Hayes Soloway P.C.

(57) ABSTRACT

A method of providing an encrypted data stream, includes obtaining a first data stream, partitioned into sections corresponding to key periods, each of a plurality of the key periods being associated with a respective value of a key, wherein each section corresponding to a key period associated with a value of the key includes at least one encrypted data unit decryptable using that associated key value, obtaining a sequence of key messages, at least some of which carry key information for obtaining at least one of the key values, obtaining a replacement data stream section, forming an encrypted output data stream, corresponding at least partially to the first data stream, by inserting the replacement data stream section so as to replace a corresponding part of the first data stream with a tail end of the replacement data stream section preceding at least part of a section of the first stream corresponding to a certain key period, and providing as output the encrypted output data stream in synchrony with an associated stream of key messages. A key message carrying key information for obtaining the key value associated with the certain key period is included in the stream of key messages so as to coincide with a point of the encrypted output data stream preceding the tail end of the replacement data stream section.

32 Claims, 12 Drawing Sheets

U.S. PATENT DOCUMENTS

| | | | | |
|---|---|---|---|---|
| 2007/0005506 A1* | 1/2007 | Candelore | | 705/59 |
| 2007/0192789 A1* | 8/2007 | Medford | | 725/31 |
| 2007/0217603 A1* | 9/2007 | Quinard | | 380/42 |

FOREIGN PATENT DOCUMENTS

| | | | |
|---|---|---|---|
| EP | 1575293 | A1 | 9/2005 |
| GB | 2322030 | A | 8/1998 |
| WO | WO-01/95613 | A1 | 12/2001 |
| WO | WO-2007/028045 | A2 | 3/2007 |

OTHER PUBLICATIONS

Angebaud, D., et al., "Scrambling and Controlling Access to an All-Digital Broadcast Programme", *International Broadcasting Convention (IBC)*, Amsterdam, Netherlands, (1992), 224-228.

"Australian Application Serial No. 2007201178, Notice of Acceptance mailed Feb. 24, 2011", 3 pgs.

* cited by examiner

METHOD OF PROVIDING AN ENCRYPTED DATA STREAM

CLAIM OF PRIORITY

The present application claims the priority benefit of the filing date of European Application (EPO) No. 06111465.8 filed Mar. 21, 2006, the entire content of which is incorporated here by reference.

BACKGROUND

EP-A1-1 111 924 discloses the insertion of advertisements into a content signal, such as a show or film. The program that is broadcasted is scrambled. Both the program signal and the advertisement signal have their corresponding ECMs (Entitlement Control Messages) inserted, i.e. content or first ECMs and advert or second ECMs, respectively. Although the advertisement signal is scrambled with advert ECMs, the advertisement signal may be sent in the clear or scrambled using the control word of the last content ECM.

Delays may occur in a decrypting device upon transition from an advertisement to the encrypted content program signal where the control word used to scramble the content program signal is being cycled. A content ECM embedded in the content program signal must first be retrieved and loaded into a decryption device of the receiver.

BRIEF DESCRIPTION OF THE DRAWINGS

An example embodiment will now be explained in further detail with reference to the accompanying drawings, in which.

DETAILED DESCRIPTION

Figure 1:
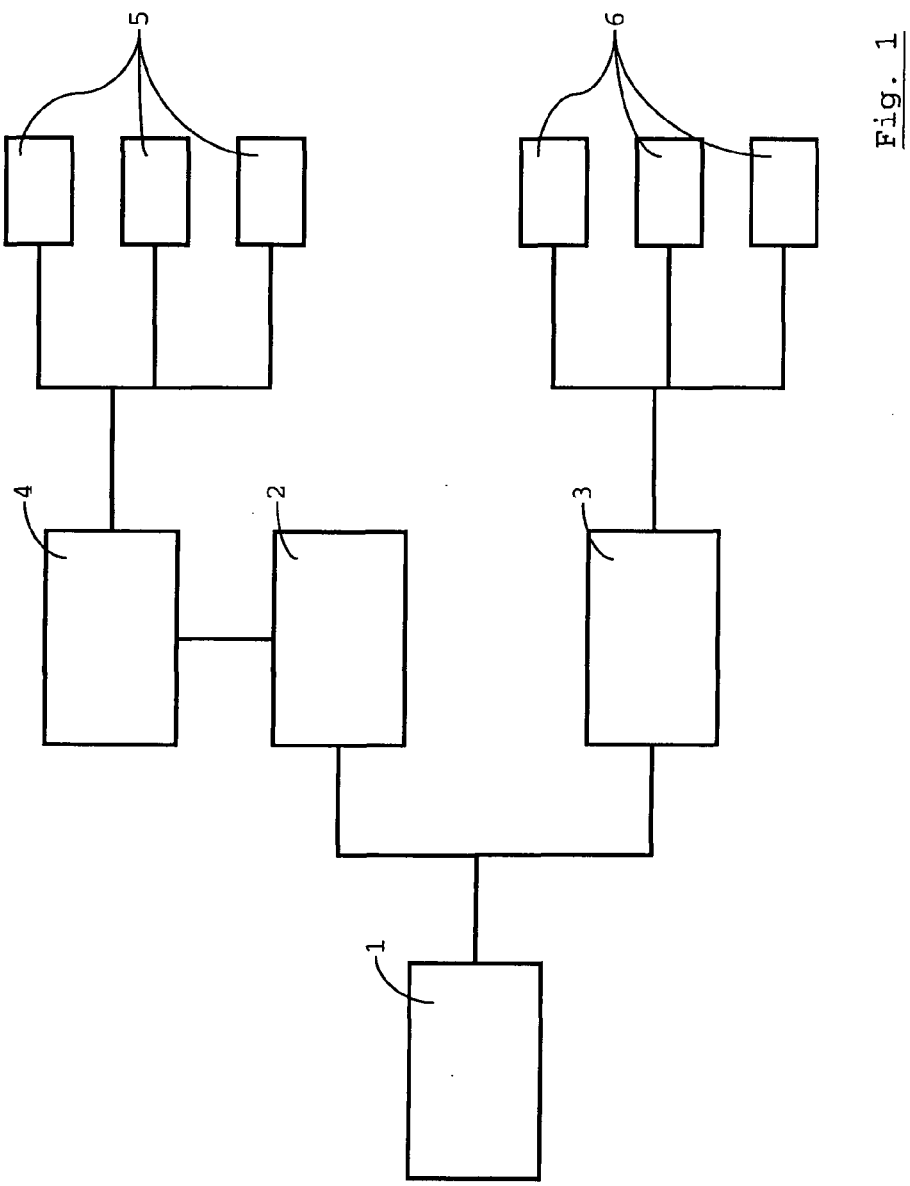
FIG. 1 illustrates a system for providing customised streams of encrypted data.

An example embodiment relates to a method of providing an encrypted data stream, including obtaining a first data stream, partitioned into sections corresponding to key periods, each of a plurality of the key periods being associated with a respective value of a key, wherein each section corresponding to a key period associated with a value of the key includes at least one encrypted data unit decryptable using that associated key value, obtaining a sequence of key messages, at least some of which carry key information for obtaining at least one of the key values, obtaining a replacement data stream section, forming an encrypted output data stream, corresponding at least partially to the first data stream, by inserting the replacement data stream section so as to replace a corresponding part of the first data stream with a tail end of the replacement data stream section preceding at least part of a section of the first stream corresponding to a certain key period, and providing as output the encrypted output data stream in synchrony with an associated stream of key messages.

An example embodiment also relates to a system for providing an encrypted data stream.

An example embodiment also relates to a server, arranged to provide an encrypted output data stream in synchrony with an associated stream of key messages in response to a request from a client system connected to the server through a network.

An example embodiment also relates to a method of providing pre-encrypted data for assembly into a customised data stream, including providing a first data stream, partitioned into sections corresponding to key periods, each of a plurality of the key periods being associated with a respective value of a key, wherein each section corresponding to a key period associated with a value of the key includes at least one encrypted data unit decryptable using that associated key value, providing a first stream of key messages, at least some of which carry key information for obtaining at least one of the key values, synchronised with the first data stream, and providing a replacement data stream section for replacing a corresponding part of the first data stream between a leading transition point and a trailing transition point, such that at least part of a section corresponding to a certain key period follows upon the trailing transition point, and providing a replacement key message stream section for replacing a part of the first stream of key messages coinciding with the part of the first data stream between the leading and trailing transition points.

An example embodiment also relates to a method of providing pre-encrypted data from a central server to a local server for assembly into a customised data stream.

An example embodiment also relates to a central head-end system.

An example embodiment also relates to a computer program.

An example embodiment seeks to provide a method of providing an encrypted data stream, a method of providing pre-encrypted data for assembly into a customised data stream and associated systems and server of the types mentioned above that enable a receiver to be provided with a customised encrypted output stream based on a pre-encrypted first data stream with sufficient key variation whilst being suitable for seamless decryption.

A method of providing an encrypted data stream according to an example embodiment, includes a key message carrying key information for obtaining the key value associated with the certain key period in the stream of key messages so as to coincide with a point of the encrypted output data stream preceding the tail end of the replacement data stream section.

Synchronisation between two streams of data in the present context indicates that the two streams are provided with a common time base, for example by combining units from each stream into a multiplex in a particular order, by attaching data to units in each stream to link a unit from one stream to a unit in another, or by adding time stamps to some or all of the units in each stream.

Because the encrypted output data stream is provided in synchrony with an associated stream of key messages, it is possible to time the arrival of the key messages relative to the encrypted output data stream. Because a key message carrying key information for obtaining the key value associated with the certain key period is included in the stream of key messages so as to coincide with a point of the encrypted output data stream preceding the tail end of the replacement data section, the key information for obtaining the key for decrypting the part of the section corresponding to the certain key period is available at the receiver before it is needed. By inserting the replacement data stream section so as to replace the corresponding part of the first data stream section, the encrypted output data stream becomes a customised version of the first stream of data.

An embodiment includes obtaining a first data stream provided with a first stream of key messages in synchrony with the first data stream, such that, for each key period corresponding to a section of the first data stream, at least one key message carrying key information for obtaining the associated key value coincides with a point in the first data stream preceding the section corresponding to that key period, wherein the stream of key messages associated with the encrypted output data stream is formed by substituting at least one replacement key message stream section for a corresponding part of the first stream of key messages.

An effect is that the synchronisation between the first stream of key messages and the first data stream can be maintained for synchronisation of the encrypted output data stream and the associated stream of key messages, when the first stream of data is customised to form the encrypted output data stream.

In an embodiment, the first data stream is obtained in synchrony with a sequence of cue signal values, and a location of the corresponding part of the first stream of key messages within the first stream of key messages is determined on the basis of at least one point coinciding with a first cue signal value.

Thus, the timing of the key message carrying key information for obtaining the key value associated with the certain key period is left to the provider of the stream of key messages and first data stream. This may be advantageous in implementations wherein a central head-end controls the play-out of customised encrypted data from several local head-ends to receivers with decryption means.

An embodiment includes obtaining the replacement data stream section synchronised with the replacement key message stream section and inserting them into the encrypted output data stream and associated stream of key messages, respectively.

An effect is that the provider of the replacement data stream section is able to ensure that the key message carrying key information for obtaining the key value associated with the certain key period is present in the key message stream associated with the encrypted output data stream at a point sufficiently far in advance of the part of the section of the first data stream corresponding to the certain key period. Thus, the system performing this embodiment of the method need only be able to replace the relevant parts of the first stream of data and first key message stream.

In an embodiment, the first data stream is obtained in synchrony with a sequence of cue signal values, and the method includes detecting a second cue signal value and determining at least a position of a leading end of the part of the first data stream to be replaced by the replacement data stream section on the basis of a point of coincidence of the detected second cue signal value with the first data stream.

Thus, it is possible to locate the part of the section of the first data stream corresponding to the certain key period without having to analyse the first stream of data or the sequence of key messages.

A variant includes obtaining two candidate replacement key message stream sections, of which a first includes at least one key message carrying key information for obtaining a key value associated with an odd key period forming the certain key period, and of which a second includes at least one key message carrying key information for obtaining a key value associated with an even key period forming the certain key period, selecting a replacement key message stream section from the two candidate replacement key message stream sections in dependence on which of two values is detected as the second cue signal value, and forming the stream of key messages associated with the encrypted output data stream by inserting the selected replacement key message stream section.

This variant allows the use of key messages carrying both a key value associated with an odd key period and a key value associated with an even key period, each with an associated identifier. The effect of being able to use such key messages is that decryption can start within a section corresponding to a current key period, be it odd or even, since each key message carries two sets of key information; one set for obtaining the key value associated with the current and one set for obtaining the key value associated with the next key period. The replacement data stream section can be inserted before either (part of) a section corresponding to an odd key period or (part of) a section corresponding to an even key period, without the decryption device being provided with the wrong key information.

In a variant, the replacement key message stream section includes at least one key message carrying key information for obtaining the key value associated with the certain key period, and the obtained replacement data stream section has a tail end part encrypted such that, at least when concatenated with the part of the section of the first data stream corresponding to the certain key period, it is decryptable under the key value associated with the certain key period.

An effect is that a receiver can continue decryption for a certain period before having to load a new key when returning from the replacement data section to a part of the encrypted output data stream originating form the first data stream. The replacement data section can be selected from one of several possible alternatives where each is already available with a synchronised corresponding key message stream section, which can be done in an efficient manner.

In an embodiment, at least a central part of the replacement data stream section includes one or several adjoining sections corresponding to key periods, at least one of the key periods being associated with a respective value of a key, wherein each section corresponding to a key period associated with a value of the key includes at least one encrypted data unit decryptable using the associated key value and corresponds substantially in information content, upon decryption under the associated key value, to a corresponding section of the part of the first data stream replaced by the replacement data stream section upon decryption thereof under a different key value.

Thus, it is possible to provide each of several receivers with a customised encrypted version of the same content, based solely on pre-encrypted parts. Such a version can be assembled on demand.

An embodiment includes obtaining a first data stream provided with a first stream of key messages in synchrony with the first data stream, such that, for each key period corresponding to a section of the first data stream, at least one key message carrying key information for obtaining the associated key value coincides with a point in the first data stream preceding the section corresponding to that key period, forming the stream of key messages associated with the encrypted output data stream by replacing a part of the first stream of key messages coincident with the replaced part of the first data stream, and replacing the corresponding part of the first data stream by the replacement section such that at least one key message carrying key information for obtaining a key associated with a key period following the certain key period in the first data stream coincides with a point in the at least part of the section of the first data stream corresponding to the certain key period.

An effect is that the key associated with the key period following the certain key period can be varied randomly by the provider of the first data stream, yet be available on time in the decrypting device of a receiver. This is achieved whilst retaining the effect of enabling easy customisation by replacement of a part of the first data stream and part of the key message stream.

An embodiment of the method includes obtaining a first data stream provided with a first stream of key messages synchronised with the first data stream, such that, for each key period corresponding to a section of the first data stream, at least one key message carrying key information for obtaining the associated key value coincides with a point in the first data stream preceding the section corresponding to that key period, obtaining a replacement data stream section synchronised to coincide with a replacement key message stream section, forming the encrypted output data stream and its associated stream of key messages by substituting the replacement data stream section and coincident data stream section for the corresponding part of the first data stream and coincident part of the first stream of key messages, respectively, such that an encrypted leading end part of the replacement data stream section is decryptable, at least when concatenated with a part from the first data stream terminated at a transition point upon which the replacement data stream section follows in the encrypted output data stream, under a key value for which key information is carried in at least a last key message in the first key message stream that is coincident with a point preceding the transition point.

The effect is that, in the decrypting device of a receiver, seamless decryption at the start of the replacement data section is possible, since the key is already available for decrypting the part terminated by the transition point.

In a variant, the part from the first data stream terminated at the transition point and the leading end part of the replacement data stream section are decryptable under the same key value, at least when concatenated.

Thus, the replacement data stream section can be one of several different replacement data stream section, all allowing seamless decryption when inserted to replace the corresponding part of the same, single first data stream.

An embodiment includes obtaining a first data stream provided with a first stream of key messages synchronised with the first data stream, such that, for each key period corresponding to a section of the first data stream, at least one key message carrying key information for obtaining the associated key value coincides with a point in the first data stream preceding the section corresponding to that key period, wherein the part of the first data stream replaced by the replacement data stream section commences at a transition point and at least a last of the first stream of key messages coinciding with a point preceding the transition point carries key information for obtaining the key value associated with the certain key period, further including forming the stream of key messages associated with the encrypted output data stream by removing from the first stream of key messages all key messages coinciding with the part of the first data stream replaced by the replacement data stream section.

This embodiment may be suitable for use in conjunction with receivers configured to load the key information obtained from each key message as it arrives. It prevents such a receiver from loading a key that is applicable to the first data stream but not the encrypted output data stream provided to it.

An embodiment includes obtaining a first data stream provided with a first stream of key messages synchronised with the first data stream, such that, for each key period corresponding to a section of the first data stream, at least one key message carrying key information for obtaining the associated key value coincides with a point in the first data stream preceding the section corresponding to that key period, wherein the part of the first data stream replaced by the replacement data stream section commences at a transition point and wherein a further part of the section of the first data stream corresponding to the certain key period precedes the transition point.

This embodiment is a further alternative allowing the decrypting device to have the key value associated with the certain key period loaded when the replacement data stream section has been processed. It need merely retain the key value already loaded for the further part of the section corresponding to the certain key period that precedes the transition point. This embodiment is especially suitable for unencrypted replacement data stream sections.

According to another aspect of an example embodiment, the system for providing an encrypted data stream is arranged to carry out a method of providing an encrypted data stream according to an example embodiment.

In an embodiment, the system includes a receiver for receiving the first data stream from a central head-end system through a first data link and a system for broadcasting the encrypted output data stream in synchrony with the associated stream of key messages to a plurality of receivers through a broadcast network.

Such a system is adapted for broadcasting a first data stream, for example a national television broadcast signal, to a local market, for example by inserting replacement data stream sections corresponding to advertisements.

According to another aspect of an example embodiment, there is provided a server, arranged to provide an encrypted output data stream in synchrony with an associated stream of key messages in response to a request from a client system connected to the server through a network, wherein the server is configured to play out from a storage system an encrypted data stream and associated stream of key messages obtainable by executing a method of providing an encrypted data stream according to an example embodiment.

Such a server is especially suitable for implementing a video-on-demand service for providing individual requesting clients with their own custom-encrypted copies of the same video.

According to another aspect of an example embodiment, the method of providing pre-encrypted data for assembly into a customised data stream is characterised by providing a replacement key message stream section including at least one key message carrying key information for obtaining the key value associated with the certain key period.

Thus, the part of the first stream of data between the leading and trailing transition points can be replaced by a replacement data stream section with an associated key message stream section, whilst still allowing a receiver of the thus obtained customised encrypted data stream to decrypt the stream seamlessly across the boundary between the replacement data stream section and part of the original first data stream following the trailing transition point.

In an embodiment, the first stream of key messages is constructed such that, for each section of the first data stream corresponding to a key period, at least one key message carrying key information for obtaining the key value associated with that key period is played out at a point coinciding with a point in the first data stream preceding that section of the first data stream.

Thus, key cycling is implemented, thereby preventing unauthorised access by means of a relatively large amount of variation in key values. The decrypting device in an authorised receiver is able to load each key value ahead of the section decryptable under it.

In an embodiment, each replacement data stream section includes an encrypted leading end part, decryptable under a key value associated with a key period corresponding to a section of the first data stream including a part immediately preceding the leading transition point, at least when concatenated with that part of the first data stream.

This makes it possible to insert an encrypted replacement data stream section and allow seamless decryption at the transition to the encrypted replacement data stream section. The decrypting device in the receiver can continue using the key obtained in the key message in the first key message stream.

In an embodiment, each replacement data stream section includes an encrypted leading end part decryptable under a key value associated with a key period corresponding to a section of the first data stream of which at least a part commences at the leading transition point.

Thus the first stream of key messages need not be adapted to a particular replacement data stream section.

In an embodiment, each replacement data stream section is provided with at least a central part including at least one encrypted section decryptable only under a different key value than a corresponding section of the first data stream between the leading and trailing transition points.

Thus, variation between streams constructed on the basis of the first stream of data and a replacement data stream section is possible without substantially differentiating by means of the information content.

In an embodiment, each replacement data stream section is partitioned into a plurality of sections corresponding to key periods, wherein at least some of the sections corresponding to key periods include at least one data unit decryptable only under a key value uniquely associated with the key period to which the section corresponds.

Thus, the replacement data stream section is protected relatively well against cryptanalysis or so-called "control word piracy" whereby key values obtained from an authorised receiver are distributed across networks.

In an embodiment, each replacement data stream section is provided with an associated replacement key message stream section synchronised with it and constructed that, at least for each section of the replacement data stream section following a leading end part of the replacement data stream section and corresponding to a key period with which a key value is associated, the replacement key message stream section includes at least one key message carrying key information for obtaining the associated key value that is coincident with a point of the replacement data stream section preceding that section of the replacement data stream section.

Thus, decryption key values can be loaded into a decrypting device ahead of receiving the encrypted replacement data stream section for which it is needed.

In an embodiment, each replacement data stream section includes an encrypted trailing end part, decryptable, at least when concatenated with at least a part of a section of the first data stream corresponding to a certain key period and following immediately upon the trailing transition point, under the key value associated with the certain key period.

This allows one to replace also, if desired, a part of the first stream of data following the trailing transition point, without having to take account of all possible combinations of replacement data stream sections and following (replacement) data stream sections.

In an embodiment, both the part of the first data stream between the leading and trailing transition points and at least one of the replacement data stream sections is provided with at least one embedded watermark unique to the first data stream and replacement data stream section concerned, respectively.

Thus, by replacing the part of the first data stream between the leading and trailing transition points, a uniquely watermarked copy of encrypted content can be provided. This does not require decryption and re-encryption.

In an embodiment, at least the part of the first data stream between the leading and trailing transition points and each replacement data stream section are obtained by encrypting a clear data stream section using at least one of a different cipher and different key values for each replacement data stream section.

Thus pre-encrypted data is provided that can be assembled into differently encrypted copies of the same clear data.

In an embodiment, the key periods associated with a key value each constitute one of alternating odd and even key periods, wherein each data unit decryptable using a key value associated with an odd key period is provided with a first identifier and each data unit decryptable using a key value associated with an even key period is provided with a second identifier, different from the first identifier, wherein in the key messages, each set of key information for obtaining a key value is provided with an identifier corresponding to one of the first and second identifiers.

Thus, key cycling is implemented, and it is also possible to provide each receiver provided with a decryption device with both the key value for a current key period and for a next key period. A receiver can start decryption halfway through a section corresponding to the current key period, just as soon as it has received a key message.

A variant includes providing at least one cue signal in synchrony with the first data stream, wherein a first cue signal value is used to indicate a location in the first data stream associated with the leading transition point, providing two candidate replacement key message stream sections, of which a first includes at least one key message carrying key information for obtaining a key value associated with an odd key period forming the certain key period, and of which a second includes at least one key message carrying key information for obtaining a key value associated with an even key period forming the certain key period, choosing the first cue signal value from two values in dependence on the certain key period corresponding to an odd or an even key period.

Thus, insertion of a replacement data stream section before (part of) a section of the first data stream corresponding to either an odd or an even key period is possible. Nevertheless, a randomly varying key value can be used.

According to another aspect of an example embodiment, there is provided a method of providing pre-encrypted data from a central server to a local server for assembly into a customised data stream, including providing a first data stream, partitioned into sections corresponding to key periods, each of a plurality of the key periods being associated with a respective value of a key, wherein each section corresponding to a key period associated with a value of the key includes at least one encrypted data unit decryptable using that associated key value, providing a first stream of key messages, at least some of which carry key information for obtaining at least one of the key values, wherein the first stream of key messages is synchronised with the first data stream, providing at least one cue signal in synchrony with the first data stream, wherein two first cue signal values signal a leading transition point and a trailing transition point in the first stream, the local server being arranged to respond to the cue signal values by replacing a part of the first stream between the leading and trailing transition points by a replacement data stream section and to play out a resultant data stream in synchrony with forwarded parts of the first stream of key messages, the forwarding being interrupted for the duration of at least a first part of the replacement data stream section, wherein a second cue signal value is provided between the two first cue signal values, the local server being arranged to resume the forwarding of the first stream of key messages in response to the second cue signal value.

By providing at least one cue signal in synchrony with the first stream of data, wherein two first cue signal values signal a leading transition point and a trailing transition point in the first stream, the local server is made aware of the location within the encrypted first stream of data of a part for which it can insert a replacement data stream section. Because a second cue signal value is provided between the two first cue signal values to a local server arranged to resume the forwarding of the first stream of key messages in response to the second cue signal value, a recipient of the played out stream of data can load the appropriate key value before receiving the part of the first stream of data following the trailing transition point.

According to another aspect of an example embodiment, there is provided a central head-end system, arranged to execute a method of providing pre-encrypted data according to an example embodiment.

According to another aspect of an example embodiment, the computer program includes a set of instructions capable, when incorporated in a machine readable medium, of causing a system having information processing capabilities to perform a method according to an example embodiment.

A general outline of a system for implementation of the methods described herein is given in FIG. 1. A central head-end system 1 provides a first stream of data, partitioned into sections corresponding to key periods.

Two specific applications will be discussed in detail herein. In a first application, the same clear content data is pre-encrypted several times to form multiple, differently pre-encrypted data streams. Sections from two or more of these pre-encrypted data streams are mixed to form a uniquely encrypted copy of the data stream. In a second application, the composition of a pre-encrypted content data stream is adapted to different final receivers. The final receivers correspond to end-users, provided with a receiver appliance including a descrambler, as well as with an access token for providing control words in unencrypted form to the descrambler. The access tokens correspond to secure devices, such as a smart card. Such a receiver system is known as such, and not discussed in further detail herein.

In the second application, the first stream of data corresponds to a stream of program content data, into which different stream sections corresponding to local advertisements are inserted by first and second local head-end systems 2,3, respectively. The first local head-end system 2 is connected to a play-out system 4, from which a first encrypted output data stream is played out to first receivers 5. A second encrypted output data stream is played out to second receivers 5 directly from the second local head-end system 3.

In the first application, the first stream of data corresponds to a stream of program content data. It is provided by the central head-end system to the first local head-end system. Duplicate sections, encrypted using different control word values and/or a different scrambling algorithm, are provided therewith. The first local head-end system 2 substitutes one or more of the duplicate sections for the corresponding parts of the first stream of data, to generate an encrypted output data stream. This encrypted output data stream is provided to the play-out system 4. The play-out system 4 advantageously corresponds to a video-on-demand server in this application. In this manner, each of the first receivers 5 can be provided with a uniquely encrypted copy of the same content data. The second local head-end system 2 need not be able to decrypt and re-encrypt the first stream of data received from the central head-end system 1 to achieve this effect.

Figure 2:
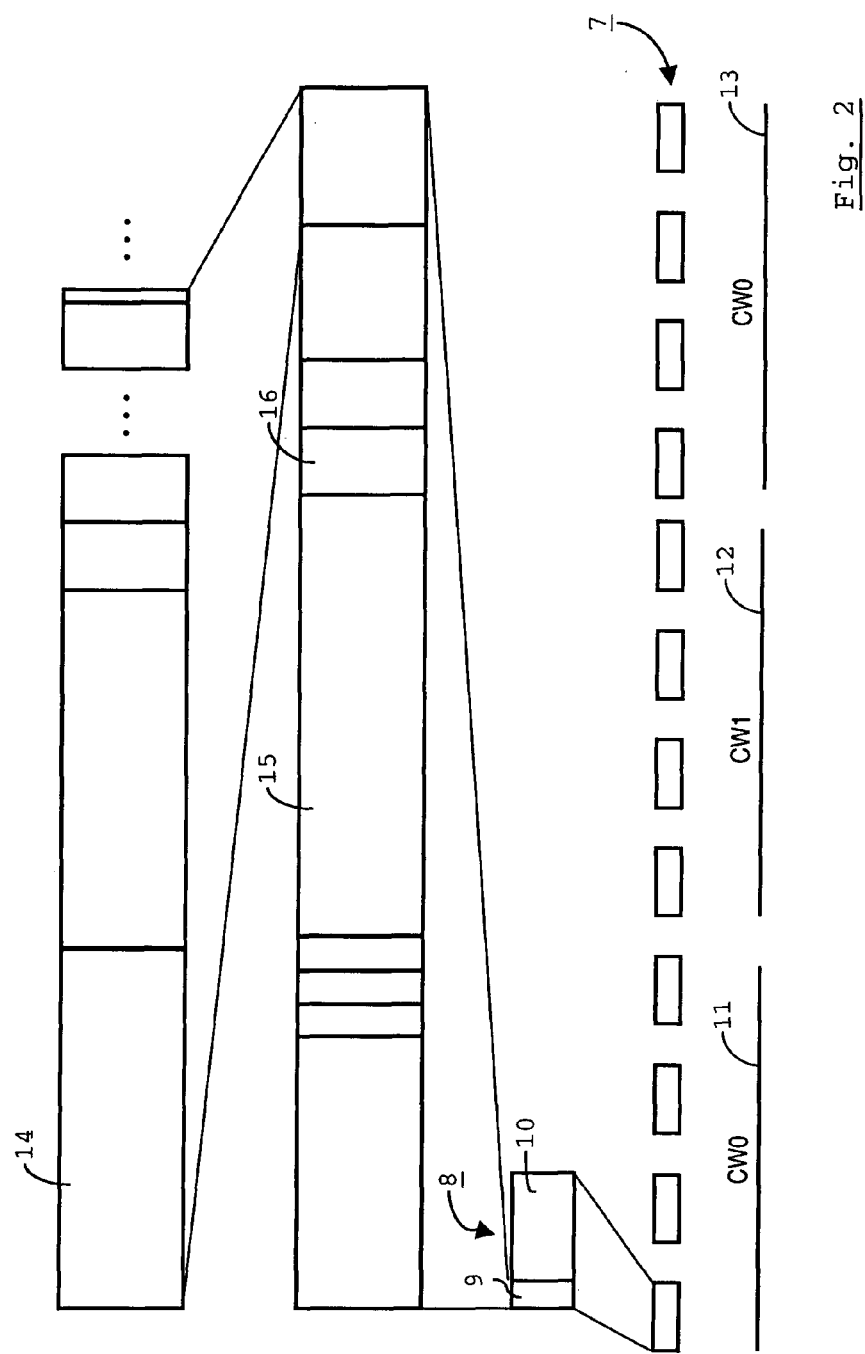
FIG. 2 illustrates components of a stream of data packets.

The central head-end system 1 generates the first stream of data as a programme stream 7 as described, for example in international standard ISO/IEC 13818-1. Some aspects of the programme stream 7 are schematically illustrated in FIG. 2. The programme stream 7 comprises MPEG-2 Transport Stream (TS) packets 8, constituted by a header 9 and a payload 10.

The payloads 10 of at least selected TS packets 8 are at least partially encrypted in the local head-end system 1 to form scrambled data units. The headers 9 are left in the clear. The programme stream 7 can be thought of as partitioned into sections corresponding to control word periods 11-13. A different control word value is associated with each of the control word periods 11-13. The control word periods 11-13 correspond to alternating odd control word periods 11,13 and even control word periods 12. Within each control word period 11-13, at least one packet payload 10 is encrypted under the control word value associated with that control word period. Sets of key information for obtaining control word values are carried in key messages known as Entitlement Control Messages (ECMs). In the present example, it will be assumed that each ECM carries two symmetrically encrypted control word values, a first associated with an odd control word period and a second associated with an even control word period, with an identifier to distinguish between the two.

The full composition of the header 9 is described in international standard ISO/IEC 13818-1. A packet identifier (PID) field 14 contains a unique number used to identify elementary streams within the programme stream 7. In the following description, it will be assumed that key messages are embedded in the programme stream 7, in that they are carried in TS packets 8 identified by a unique PID value linked to the programme stream by means of a table, the programme map table, carried in the programme stream 7. In another embodiment, the programme stream 7 contains pointers to key messages in a sequence of key messages provided out of band, for example in Internet Protocol (IP) messages over the Internet. In another embodiment, a stream of ECMs is synchronised with the programme stream 7 by means of time stamps in the ECMs and in a Program Cock Reference (PCR) field 15 of the TS packets 8. Thus, both a stream of key messages associated with the programme stream 7 and the programme stream 7 itself are provided with common time base. This synchronisation information allows one of the first and second receivers 5,6 to time the processing of key messages relative to the data units within the programme stream 7 that it receives. The same holds true for the first and second local head-end systems 2,3.

A transport scrambling state control field 16 is two bits in size. A first combination of bits indicates that the payload 10 of the TS packet 8 has been scrambled using a control word value associated with an odd control word period. A second combination of bits indicates that the payload 10 of the TS packet 8 has been scrambled using a control word value associated with an even control word period. Thus, sections of the programme stream 7 corresponding to odd control word periods and those corresponding to even control word periods can be identified. Boundaries between successive sections corresponding to successive control word period can be identified by a change in the value of the transport scrambling state control field 16.

Figure 3:
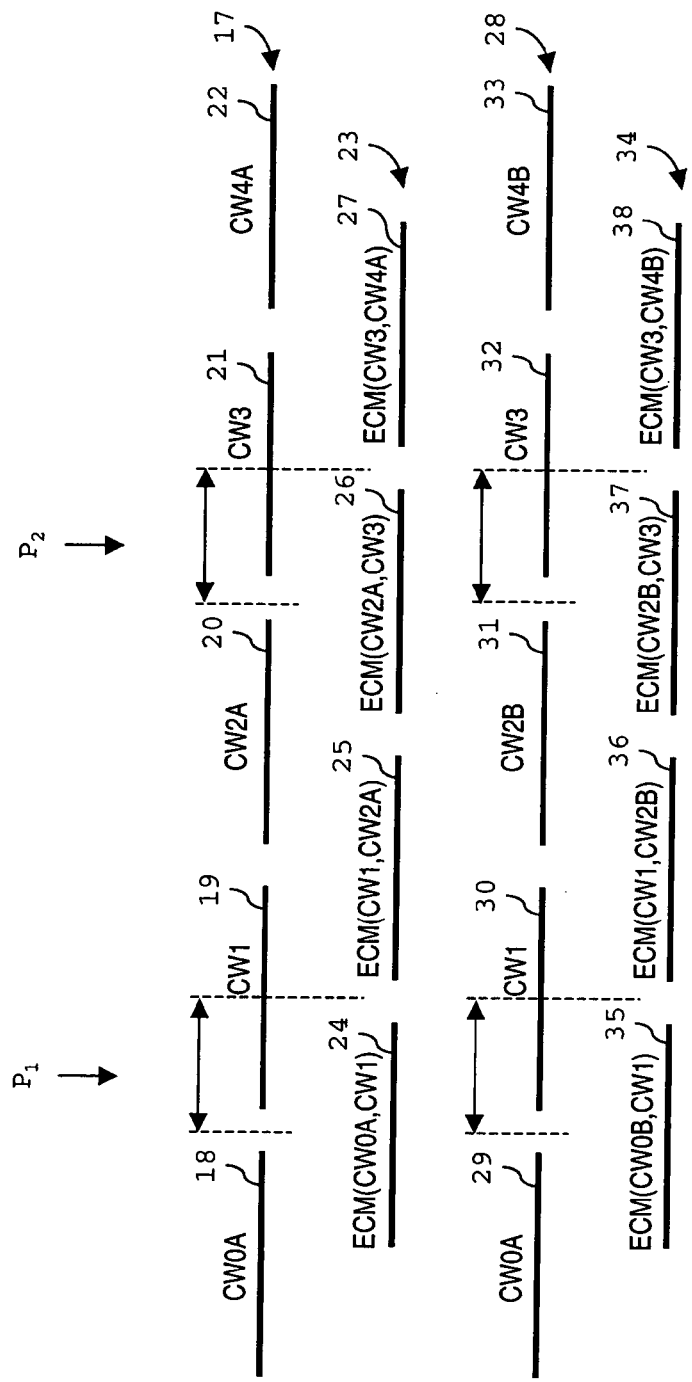
FIG. 3 illustrates two pre-encrypted data streams for assembly into a customised encrypted data stream according to one method.

Referring to FIG. 3, a first stream 17 of pre-encrypted data is illustrated as a succession of sections corresponding to control word periods 18-22. Each of the control word periods 18-22 is associated with a respective control word value, and the control word periods constitute alternating even control word periods 18,20,22 and odd control word periods 19,21. Each section corresponding to a control word period 18-22 includes at least one MPEG-2 TS packet 8 of which the payload is decryptable using the control word value associated with that particular control word period. The first stream 17 of pre-encrypted data is provided with a first ECM stream 23, synchronised with the first stream 17 of pre-encrypted data in one of the ways discussed above with reference to FIG. 2.

The first ECM stream 23 is partitioned into sections corresponding to ECM periods 24-27. Each ECM carries two sets of key information for obtaining two successive control words, as explained above. The composition of the ECMs changes at the start of each new ECM period 24-27. Thus, each ECM in a section corresponding to a first ECM period 24 carries the encrypted control words associated with a zeroth and first control word period 18,19 of the first stream 17 of pre-encrypted data. Each ECM in a section corresponding to a second ECM period 25 carries the encrypted control word values associated with a first control word period 19 and a second control word period 20, etc. Since the start of each ECM period coincides with an ECM, it can be seen from FIG. 3 that, for each control word period 18-22, an ECM carrying the control word value associated with that control word period coincides with a point in a section of the first stream 17 corresponding to a preceding control word period. In that way, the control word value is available ahead of the section corresponding to the associated control word period. The value in the transport scrambling state control field 16 indicates when the new control word value should first be used.

A second stream 28 of pre-encrypted data is partitioned into sections corresponding to control word periods 29-33. Each of the control word periods 29-33 is associated with a respective control word value, which differs for consecutive control word periods. The control word periods 29-33 constitute alternating even control word periods 29,31,33 and odd control word periods 30,32. Each section corresponding to a control word period 29-33 includes at least one MPEG-2 TS packet 8 of which the payload is decryptable using the control word value associated with that particular control word period. The second stream 28 of pre-encrypted data is provided with a second ECM stream 34 synchronised with the second stream 28 of pre-encrypted data in one of the ways discussed above with reference to FIG. 2.

Again, each ECM in a section corresponding to a first ECM period 35 carries the encrypted control words associated with a zeroth and first control word periods 29,30 of the second stream 28 of pre-encrypted data. Each ECM in a section corresponding to a second ECM period 36 carries the encrypted control words associated with the first control word period 30 and a second control word period 31, etc. Thus, also for the second stream 28 of pre-encrypted data, an ECM carrying the control word value associated with a particular control word period coincides with a point in a section of the second stream 28 of pre-encrypted data corresponding to a control word period preceding that particular control word period.

The central head-end system 1 generates the first stream 17 of pre-encrypted data and the second stream 28 of pre-encrypted data by scrambling the same clear programme stream 7. It uses different control word values for packet payloads 10 in certain corresponding sections of the first stream 17 and second stream 28 of pre-encrypted data. Alternatively or additionally, a different cipher may be used. Thus, the section of the first stream 17 corresponding to the zeroth control word period 18 is obtained on the basis of substantially the same clear content data as the section of the second stream 28 corresponding to its zeroth control word period 29.

Prior to encryption under the control word, one or more data units in a clear section corresponding to a control word period are provided with a watermark unique to the control word period and the stream 17,28 of pre-encrypted data. Thus, for example, a section of the first stream 17 corresponding to the second control word period 20 is obtained by providing a clear data stream section with a first watermark and then encrypting it under an associated first control word value. The corresponding section of the second stream 28 of pre-encrypted data, corresponding to the second control word period 31 in that stream, is obtained by providing the same clear data stream section with a second watermark, different from the first watermark, and then encrypting it under an associated second control word value, different from the first control word value.

A customised pre-encrypted output data stream 39 (FIG. 4) is generated in, for example, the first local head-end system 2. To this end, a replacement section is taken from the second stream 28 of pre-encrypted data and substituted for a corresponding part of the first stream 17 of pre-encrypted data.

That part of the first stream 17 of pre-encrypted data is located between a leading transition point $P_1$ and a trailing transition point $P_2$.

Respective sequences of cue signal values are provided in synchrony with the first and second streams 17,28 of pre-encrypted data. Particular cue signal values signal identify the location of the leading and trailing transition points $P_1, P_2$.

The TS packets 8 carrying the ECMs or pointers to particular ECMs of the first and second ECM streams 23,34 are time-division multiplexed with the TS packets 8 of the first and second streams 17,28 of pre-encrypted data, respectively. Thus, a part of the first ECM stream 23 coinciding with the part of the first stream 17 of pre-encrypted data between the leading and trailing transition points $P_1$, $P_2$, is automatically replaced by a corresponding part of the second ECM stream 34.

From FIG. 3 and the foregoing description, it will be apparent that the central section of the first stream 17, corresponding to the second control word period 20 corresponds substantially in information content, upon decryption under the associated control word value CW2A, to the section of the second stream 28 of pre-encrypted data corresponding to the second control word period 31 of the second stream 28 upon decryption under the associated control word value CW2B. The two control word values CW2A and CW2B are different. The correspondence in information content signifies that both are based on the same clear data stream section, except for a watermark. The watermarks do not substantially alter the information content.

The sections corresponding to the second control word periods 20,31 are situated between sections corresponding to the first control word periods 19,30 and third control word periods 21,32. The control word values associated with the first control word periods 19,30 of the first and second streams 17,28 of pre-encrypted data are the same. This is also true for the control word values associated with the third control word periods 21,32 of the first and second streams 17,28 of pre-encrypted data.

The leading transition point $P_1$ is situated at or after the transition from the section corresponding to the $0^{th}$ control word period 18,29 to the first control word period 19,30. The trailing transition point $P_2$ is situated at or after the transition from the section corresponding to the second control word period 20,31 to the third control word period 21,32. At least part of the section corresponding to the third control word period 21,32 follows upon the trailing transition point $P_2$. As a consequence, the section of the second ECM stream 34 that replaces part of the first ECM stream 23 also contains an ECM carrying key information for obtaining the control word CW3 associated with the third control word period 21 in the first stream 17 of pre-encrypted data.

To give a relatively long time interval for loading a control word value, the first ECM of each ECM period coincides with a point in the first or second stream 17,28 of pre-encrypted data substantially in the middle of a section corresponding to a control word period. So as also to maximise the time available for loading the control word value CW3 associated with the third control word period 21,32, the leading and trailing transition points $P_1, P_2$ coincide with a transition between successive ECM periods in another embodiment (not shown). In any case, the trailing transition point $P_2$ precedes the transition to fourth ECM periods 22,33. A result of this is that a tail end part of the replacement data stream section from the second stream 28 of pre-encrypted data is encrypted such that, at least when concatenated with a part of the section of the first stream 17 of pre-encrypted data corresponding to the third control word period 21, it is decryptable under the same control word value CW3. Concatenation may be a requirement in case a block cipher in chaining mode is used across a section corresponding to a control word period.

By the same token, the encrypted leading end part of the replacement data stream section is decryptable, at least when concatenated with the part of the first stream 17 of pre-encrypted data in the section corresponding to the first control word period 19 that precedes the leading transition point $P_1$ under the same control word value CW1. The start of the first ECM period 24 in the first ECM stream 23 precedes this leading transition point $P_1$, so that seamless descrambling is made possible.

Figure 4:
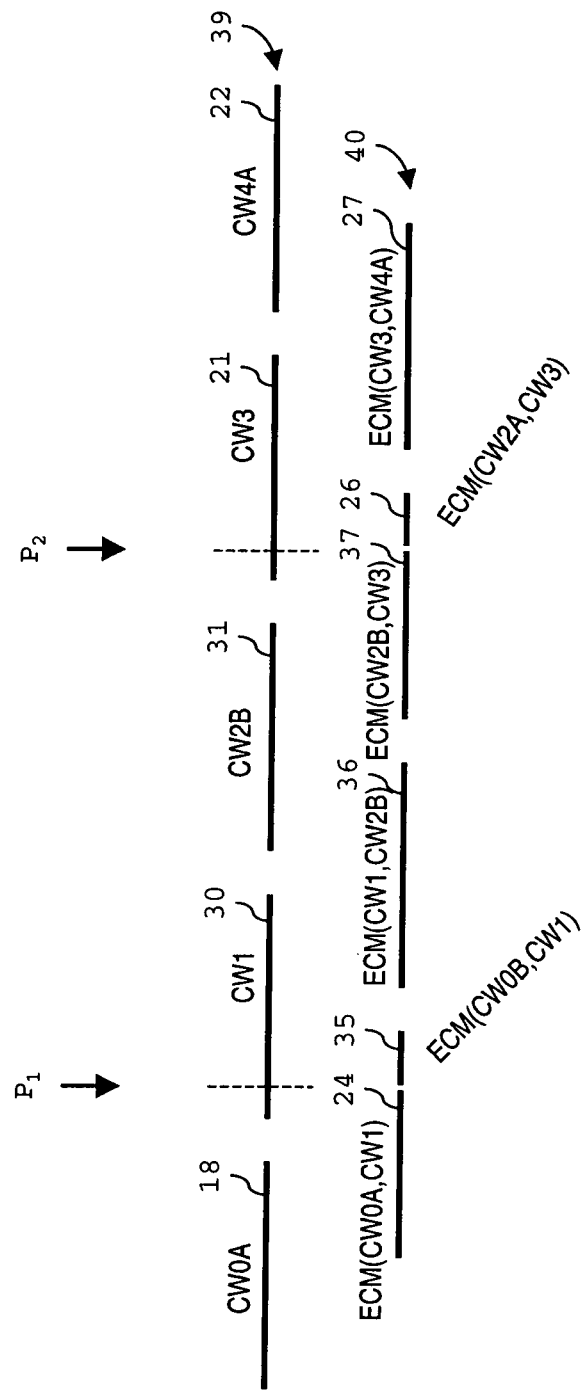
FIG. 4 illustrates a customised encrypted data stream assembled on the basis of the pre-encrypted data streams illustrated in FIG. 3.

Although the description of FIGS. 3 and 4 has been limited to replacement of only one part of the first stream 17 of pre-encrypted data by a replacement section from the second stream 28 of pre-encrypted data, it will be apparent that further transition points will in practice be provided. They each fall within a leading part of sections corresponding to control word periods with which the same control word value has been associated for both the first and second stream 17,28 of pre-encrypted data. Thus, sections from the first and second streams 17,28 of pre-encrypted data can be mixed to provide unique, customised pre-encrypted output data streams. The central parts of the replacement sections are only decryptable under different control word values. Consequently, the customised pre-encrypted output data stream 39 can only be descrambled by means of a unique sequence of control words. This deters control word piracy. More variation can be provided by providing a third and further streams of pre-encrypted data each with a section corresponding to the second control word period decryptable under a different control word value. However, an effect of the method outlined above is that only a few pre-encrypted streams of data are needed to generate many differently encrypted customised output streams. By adding watermarks, each decrypted copy can be traced back to the recipient of a particular customised pre-encrypted output data stream, since the multiplexing of sections from different pre-encrypted streams also results in a unique sequence of watermarks.

Figure 5:
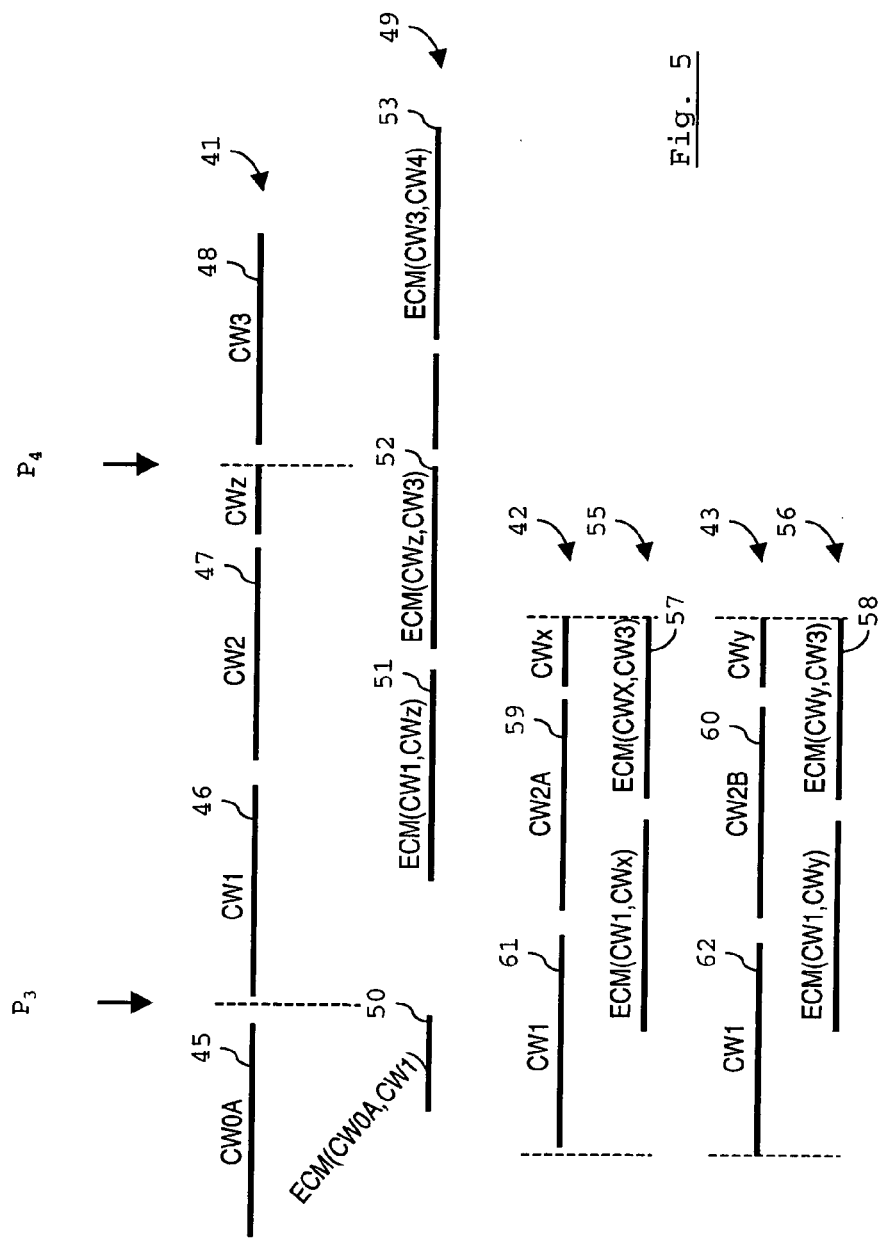
FIG. 5 illustrates a pre-encrypted data stream and two replacement data stream sections for assembly into a customised encrypted data stream according to a second method.

In the embodiments illustrated in FIGS. 5-12, similar methods are used to customise the content of data streams provided to the first and second receivers 5,6. These embodiments correspond to the second implementation discussed above. As an example, it will be assumed that the central head-end system 1 provides a first programme stream 41 (FIG. 5). The first local head-end system 2 replaces a part between a leading transition point $P_3$ and a trailing transition point $P_4$ by a first data stream section 42, corresponding to a first advertisement. The second local head-end system 3 replaces the same part of the first programme stream 41 by a second data stream section 43, corresponding to a second advertisement. Thus, the first local head-end system 2 provides an encrypted output data stream 44 (FIG. 6) tailored to the first receivers 5, whilst the second local head-end system 3 provides an encrypted output data stream tailored to the second receivers 6.

The first programme stream 41 is partitioned into sections corresponding to control word periods 45-48. In the example, in each of sections corresponding to a zeroth control word period 45, a first control word period 46, a second control word period 47 and a third control word period 48, at least one TS packet payload 10 is decryptable using a control word value uniquely associated with that control word period. In other words, the control word is cycled in the first programme stream 41.

A first ECM stream 49 is provided in synchrony with the first programme stream 41 using any of the techniques described above with regard to the programme stream 7. For each control word period 45-48 a corresponding ECM period 50-53 commences at a point coinciding with a preceding control word period. Thus, a first ECM period 50 commences at a point substantially half-way through the $0^{th}$ control word period 45, a second ECM period 51 commences at a point substantially half-way through the $1^{st}$ control word period 46, etc.

Each section of the first ECM stream 49 corresponding to one of the ECM periods 50-53 commences with a first ECM carrying key information for obtaining a control word value for decrypting a TS packet payload 10 in a section of the first programme stream 41 corresponding to a control word period following the section with which that first ECM coincides.

Figure 6:
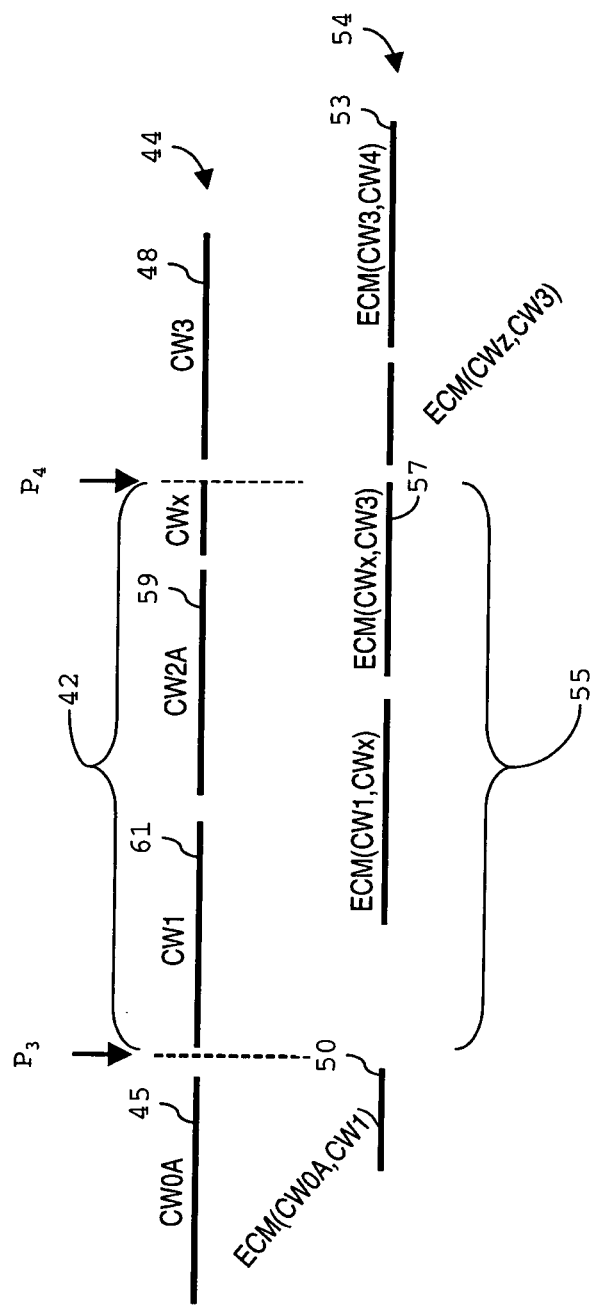
FIG. 6 illustrates a customised encrypted data stream assembled using the second method.

As shown in FIG. 6, the encrypted output data stream 44 is synchronised to coincide with an output ECM stream 54. When one of the first data stream section 42 and second data stream section 43 is substituted for the part of the first programme stream 41 between the leading transition point $P_1$ and trailing transition point $P_2$, an associated one of a first replacement ECM stream section 55 and a second replacement ECM stream section 56 is substituted for a corresponding part of the first ECM stream 49.

In a first variant, the first local head-end system 2 submits the clear advertisement to the central head-end system 1. It receives the first data stream section 42 in return, together with the ECMs in the first replacement ECM stream section 55. The return transmission may be effected online or by means of a data carrier. The local head-end system 2 then synchronises the first replacement ECM stream section 55 to coincide with the first data stream section 42 when playing out the encrypted output data stream. In another embodiment, the synchronisation is carried out at the central head-end system 1. The first local head-end system 2 obtains the first data stream section 42 synchronised to coincide with the first replacement ECM stream section 55 and inserts them into the encrypted output data stream 44 and associated first ECM stream 49, respectively, whilst playing them out to the first receivers 5 via the play-out system 4.

The first local head-end system 2 detects the location of the leading and trailing transition points $P_3$, $P_4$, by detecting the occurrence of particular values of a cue signal that is provided in synchrony with the first programme stream 41.

As illustrated in FIG. 5, each of the first and second replacement ECM stream sections 55,56 terminates with a final ECM period 57,58, respectively, corresponding to a series of one or more ECMs carrying key information for obtaining the control word value associated with the third control word period 48 corresponding to the section part immediately following the trailing transition point $P_4$ in the first programme stream 41. Thus, seamless decryption of the encrypted output data stream 44 in the first receivers 5 is assured.

In an embodiment, the first local head-end system 2 obtains two candidate replacement ECM stream sections, of which a first includes at least one ECM carrying key information for obtaining a key value associated with an odd key period forming the third control word period 48, and of which a second includes at least one ECM carrying key information for obtaining a key value associated with an even key period forming the third control word period 48. The first replacement ECM stream section 57 is selected from among the two candidate replacement ECM stream sections in dependence on which of two values is detected as the cue signal value used to locate the leading transition point $P_3$.

As is illustrated in FIG. 5, the advertisements are accessible only to the authorised receivers for which they are intended. This is because a central section in each of the first and second data stream sections 42,43, corresponding to respective second control word periods 59,60, includes at least one TS packet payload 10 decryptable using a control word value that is associated with the second control word period 59,60 and that is different for the two control word periods 59,60. By contrast, an encrypted leading end part, corresponding to respective first control word periods 61,62 is decryptable using the same control word value for each of the first and second replacement data stream sections 42,43. At least one ECM carrying the associated encrypted control word value is included in a section of the first ECM stream 49 corresponding to the first ECM period 50. This ensures seamless decryption in the first receivers 5 upon transition to the first replacement data stream section 42 without having to leave part of the first replacement data stream section 42 in the clear.

Figure 7:
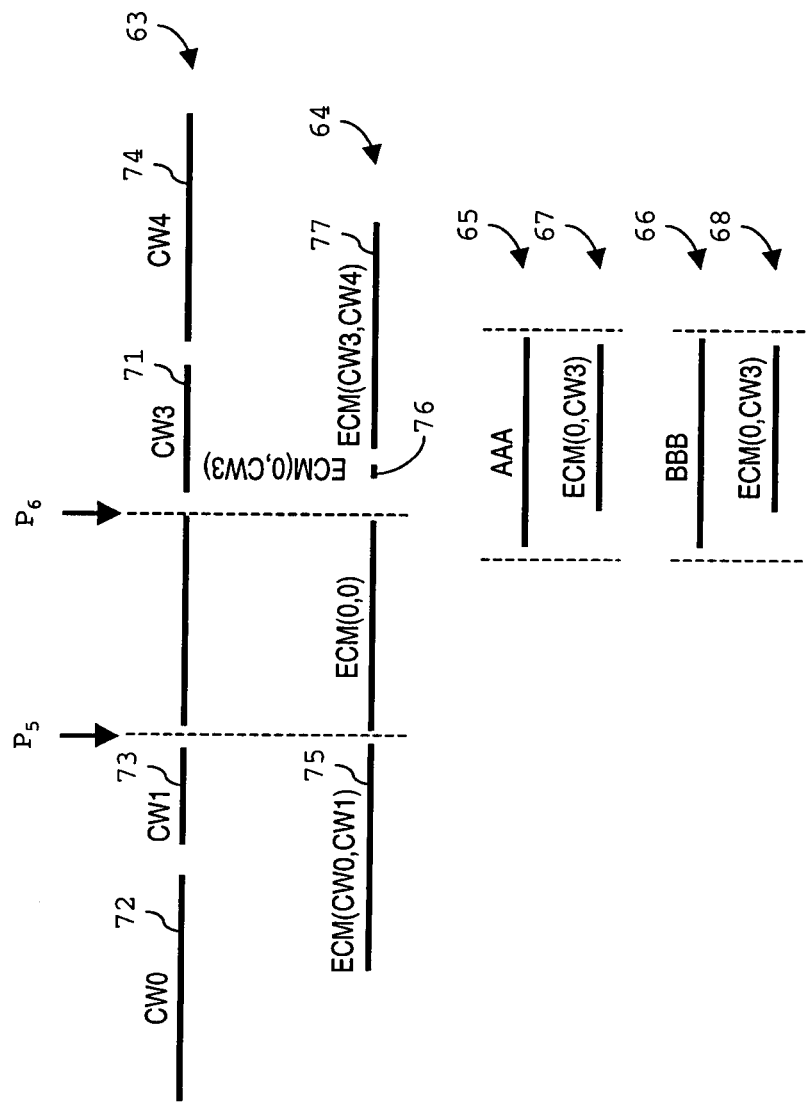
FIG. 7 illustrates a pre-encrypted data stream and two replacement data stream sections for assembly into a customised encrypted data stream according to a third method.
Figure 8:
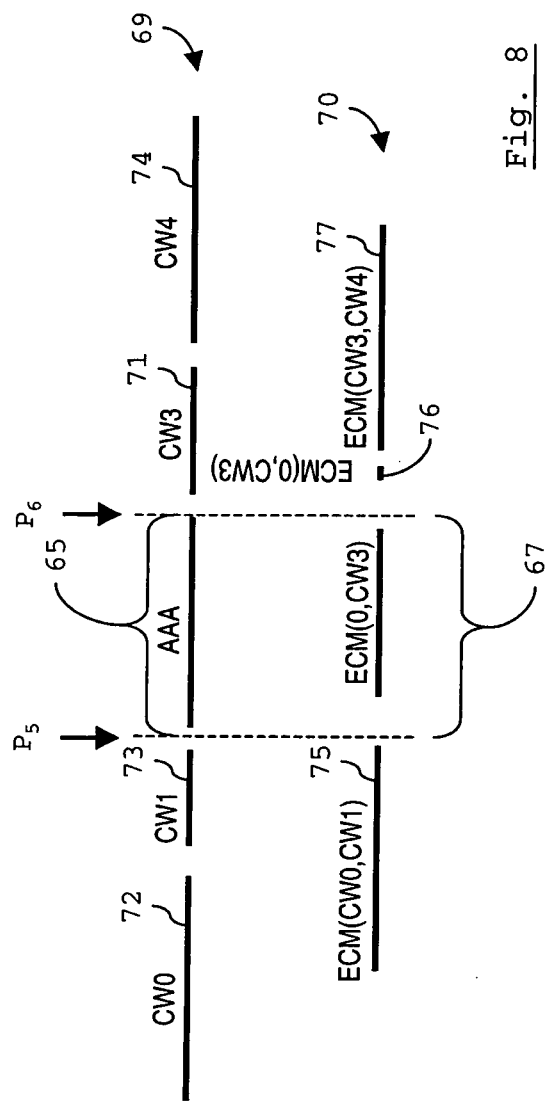
FIG. 8 illustrates a customised encrypted data stream assembled using the third method.

In the embodiment illustrated in FIGS. 7 and 8, a first programme stream 63 is provided that is similar to the first programme stream 41 of FIG. 5. A part between a leading and trailing transition point $P_4$, $P_5$ is, however, not encrypted. That part is synchronised to coincide with a part of an associated first ECM stream 64 that contains only "dummy ECMs". These are ECMs that do not contain any key information. In another embodiment, there are no ECMs coinciding with the part of the first programme stream 41 between the leading and trailing transition points $P_5$, $P_6$.

A first replacement data stream section 65 and second replacement data stream section 66 are provided to the first and local head-end systems 2,3, respectively. These replacement data stream sections 65, 66 contain different advertisements, and are both unencrypted. They are each provided with at least one ECM for forming associated first and second replacement ECM stream sections 67,68, respectively.

The first local head-end system 2 forms an encrypted output data stream 69 on the basis of the first programme stream 63 by inserting the first replacement data stream section 65 so as to replace a part of the first programme stream 63 between the leading and trailing transition points $P_5$, $P_6$. The associated first replacement ECM stream section 67 is inserted into an output ECM stream 70 associated with, and provided in synchrony with, the encrypted output data stream 69.

The start of the first replacement ECM stream section 67 in the output ECM stream coincides with a point preceding a section corresponding to a third control word period 71. This section follows immediately upon the trailing transition point $P_4$, and is thus present in both the first programme stream 63 and the encrypted output data stream 69. The ECM carries the encrypted control word value associated with the third control word period 71. That control word value is different from the one associated with zeroth control word period 72, first control word period 73 and fourth control word period 74.

Within the first ECM stream 64, a section corresponding to a first ECM period 75 includes ECMs carrying encrypted control word values associated with the zeroth and first control word periods 72,73. A part of a section corresponding to a partial second ECM period 76 includes ECMs carrying only the encrypted control word value associated with the third control word period 71. A section corresponding to a third ECM period 77 includes ECMs carrying encrypted control word values associated with the third and fourth control word periods 71,74. As in the other embodiments, the third ECM period 77 commences at a point coinciding with the third control word period 71, in other words, preceding the fourth control word period 74.

Figure 9:
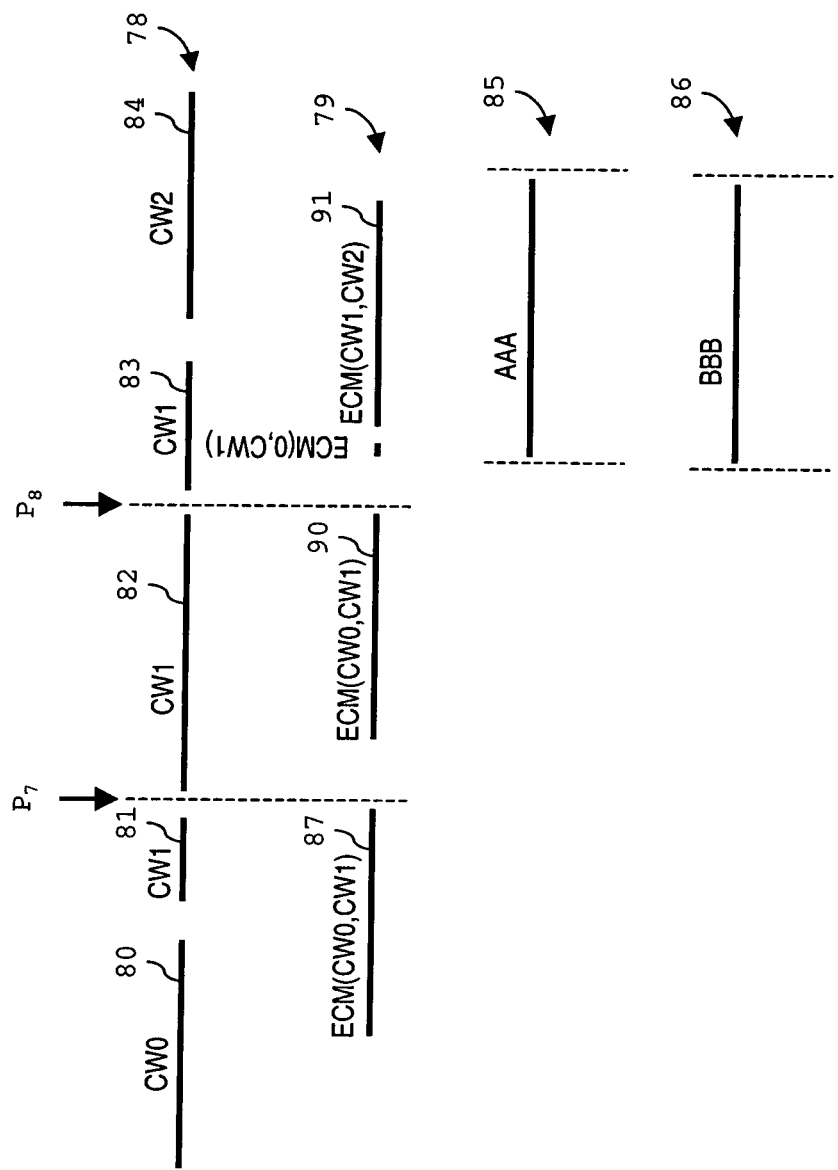
FIG. 9 illustrates a pre-encrypted data stream and two replacement data stream sections for assembly into a customised encrypted data stream according to a fourth method.
Figure 10:
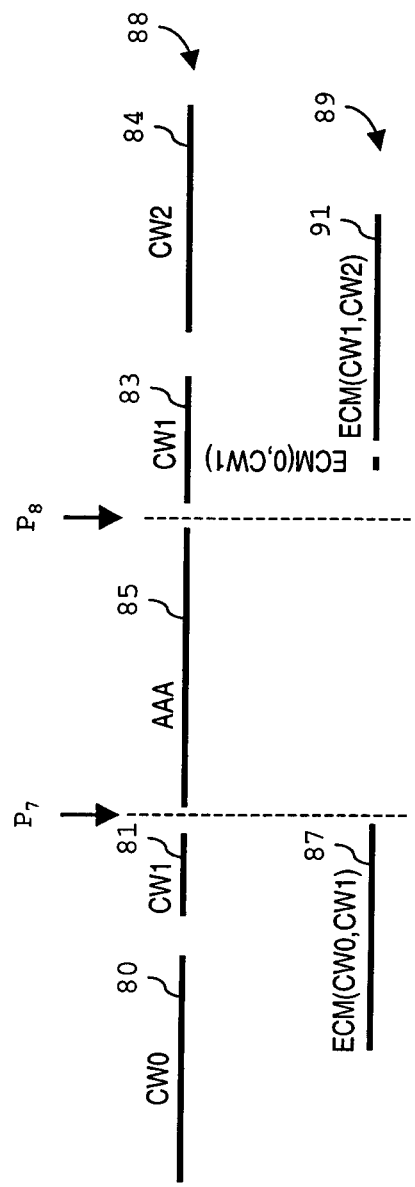
FIG. 10 illustrates a customised encrypted data stream assembled using the fourth method.

In another embodiment, illustrated in FIGS. 9,10, a first programme stream 78 is provided in synchrony with a first ECM stream 79. The illustrated part of the first programme stream 78 is partitioned into sections corresponding to a zeroth control word period 80, first, second and third parts of a section corresponding to first, second and third parts 81-83 of a first control word period, and a section corresponding to a second control word period 84. At least one TS packet payload 10 in each of the first and third parts 81,83 of the first control word period is decryptable using a control word value associated with the first control word period. At least one TS packet payload 10 in each of the zeroth and second control word periods 80,84 is decryptable using different respective control word values, associated with the zeroth and second control word periods, respectively.

A leading and trailing transition point $P_7$, $P_8$ are located within the first control word period; one at the transition from the first part 81 to the second part 82, and the other at the transition from the second part 82 to the third part 83. The part of the first programme stream 78 between the leading and trailing transition points $P_7,P_8$ is replaced by one of a first and second replacement data stream section 85,86, depending on whether the replacement is carried out by the first local head-end system 2 or the second local head-end system 3. The part of the first programme stream 78 that is replaced thus commences at the leading transition point $P_7$, and the first part 81 of the section corresponding to the $1^{st}$ control word period precedes the leading transition point $P_7$.

Each of the first and second replacement data stream sections 85,85 is unencrypted. In the illustrated embodiment, there is no replacement ECM stream section associated with either of the first and second replacement data stream sections 85,86. Part of the first ECM stream 79 is thus replaced by an empty ECM stream section. In another embodiment, a replacement ECM stream section including only ECMs devoid of key information, i.e. "dummy ECMs", may be provided with each of the first and second replacement data stream sections 85,86.

A section of the first ECM stream 79 corresponding to a first ECM period 87 commences with a first ECM (not shown separately) coinciding with a point in the section of the first programme stream 78 corresponding to the zeroth control word period 80. This point obviously precedes the third part 83 of the first control word period, which follows directly upon the trailing transition point $P_8$. Each of the ECMs included in the section of the first ECM stream 79 corresponding to the first ECM period 87 carries encrypted key information for obtaining the control word value associated with the first control word period.

An encrypted output data stream 88 (FIG. 10) formed by the first local head-end system 2 corresponds to the first programme stream 78, except for the first replacement data stream section 85, which has been inserted. An associated synchronised output ECM stream 89 corresponds to the first ECM stream 79, except for a part 90 of the first ECM period 87 coinciding with the second part 82 of the first control word period, which part 90 is not forwarded. From FIG. 10, it will be obvious that at least one ECM carrying the control word value associated with the first control word period coincides with a point in the encrypted output stream 88 preceding the first replacement data stream section 85. Since no other key information is provided concurrently with the part of the output ECM stream 89 coinciding with the first replacement data stream section 85, the first receivers 5 always have the control word value associated with the $1^{st}$ control word period loaded into their decryption device by the time the third part 83 of the first control word period is presented for decryption.

A second ECM period 91 commences at a point coinciding with a point in the third part 83 of the first control word period. Each ECM in the section of the first ECM stream 79, and thus also in the output ECM stream 89, carries key information for obtaining the control word value associated with the second control word period 84. In this way, control word cycling is implemented to increase the security of the encrypted output stream 88 without leading to interruptions in the first receivers 5 at the trailing transition point $P_8$ during decryption.

In the embodiment illustrated in FIGS. 9 and 10, as in other embodiments, the positions of the leading and trailing transition points $P_7,P_8$ may be derived from a cue signal provided in synchrony with the first programme stream 78. A transition to a particular cue signal value coincides with a point in the first programme stream 78 from which the first local head-end system 2 can derive the position of one of the leading and trailing transition points $P_7$, $P_8$.

Figure 11:
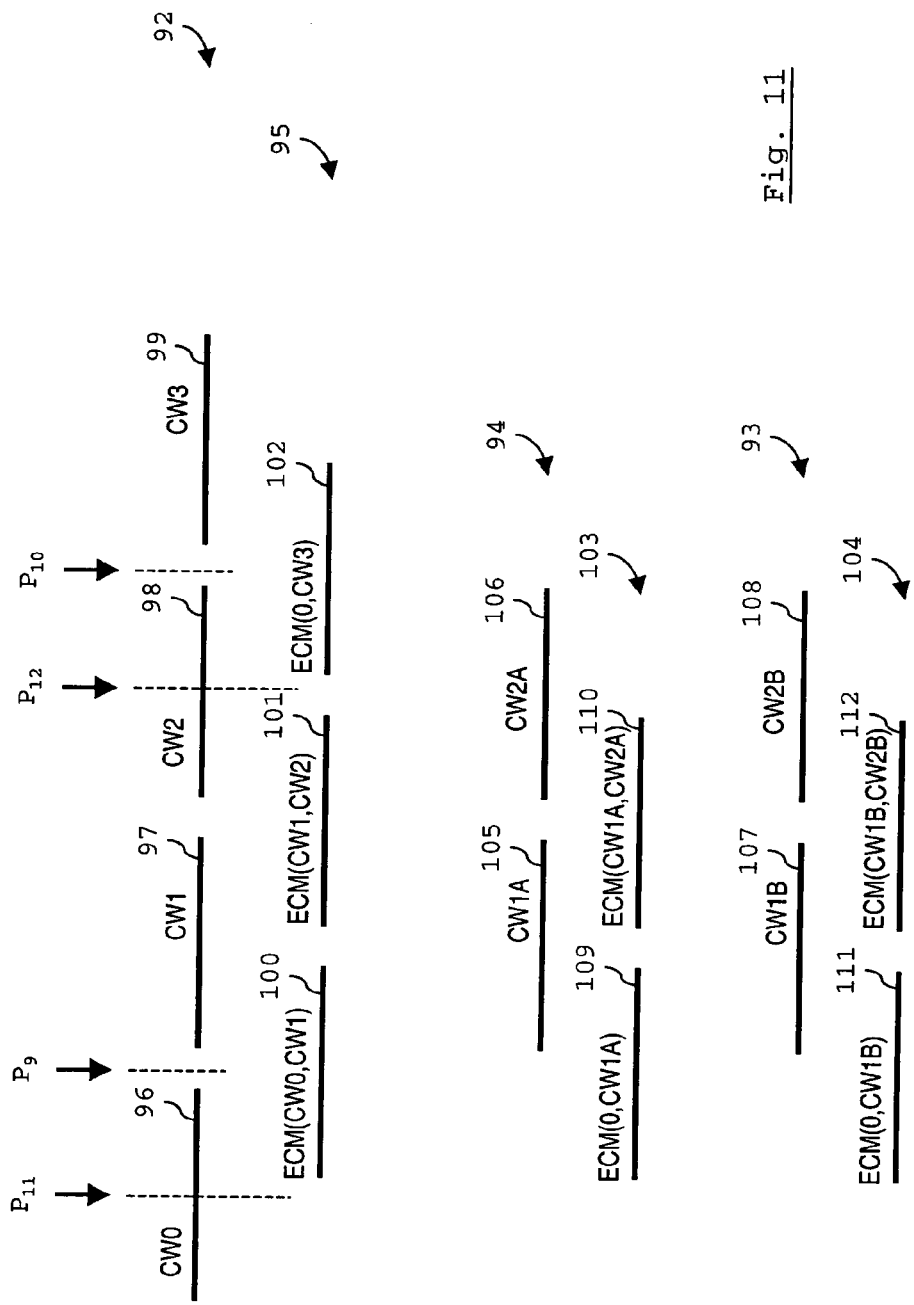
FIG. 11 illustrates a pre-encrypted data stream and two replacement data stream sections for assembly into a customised encrypted data stream according to a fifth method.
Figure 12:
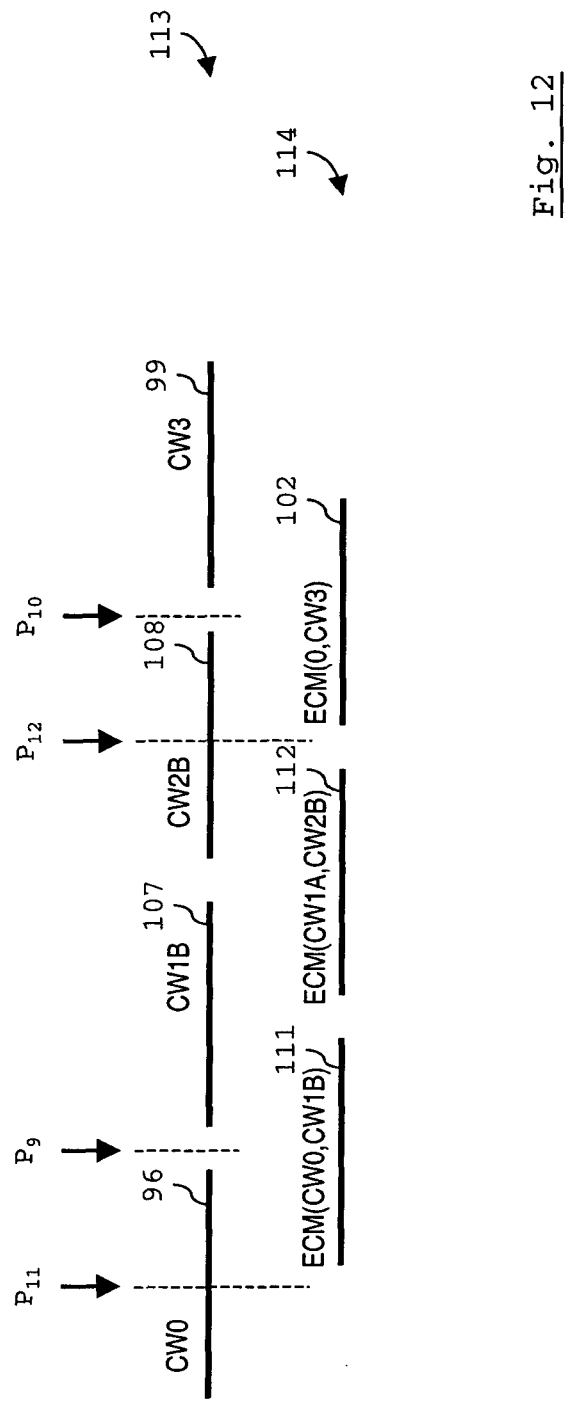
FIG. 12 illustrates the result of applying the fifth method.

Referring to FIGS. 11 and 12, an embodiment is illustrated in which the second local head-end system 3 replaces part of a first programme stream 92 situated between a leading transition point $P_9$ and a trailing transition point $P_{10}$ by a second replacement data stream section 93. The first local head-end system 2 does the same (not illustrated in detail) with a first replacement data stream section 94. The first programme stream 92 is provided to the first and second local head-end systems 2,3 by the central head-end system 1.

The central head-end system 1 provides the first programme stream 92 in synchrony with a first ECM stream 95. Synchronisation is again achieved using any of the methods outlined above with reference to the programme stream 7 illustrated in FIG. 2. The central head-end system 1 provides also at least one cue signal in synchrony with the first programme stream 92. In one embodiment, the cue signal is provided in the shape of a sequence of flags in headers 9 of TS packets 8 included in the first programme stream 92. In another embodiment, the cue signal is provided as a separate physical signal via the same or a different network link between the central head-end system 1 and the first and second local head-end systems 2,3.

The first programme stream 92 is partitioned into sections corresponding to control word periods 96-99. In the illustrated embodiment, a different control word value is associated with each of the control word periods 96-99, or at least with each of any two consecutive control word periods 96-99. Within each section corresponding to one of the control word periods 96-99 at least one payload 10 of a TS packet 8 is decryptable using the control word value associated with the control word period to which that section corresponds.

The first ECM stream 95 is partitioned into sections corresponding to ECM periods 100-102. Each of the ECM periods 100-102 commences with an ECM carrying two encrypted control word values. Each section corresponding to an ECM period 100-102 contains only copies of the ECM with which it commences and runs until the next ECM period commences with a different ECM. ECMs in a section of the first ECM stream 95 corresponding to a first ECM period 100 carry the control word values associated with a zeroth and a first control word period 96,97. ECMs in a section of the first ECM stream 95 corresponding to a second ECM period 101 carry encrypted control word values associated with the first and a second control word period 97,98. ECMs in a section of the first ECM stream 95 corresponding to a third ECM period 102 carry only an encrypted control word value associated with a third control word period 99.

The control word periods 96-99 correspond to alternating odd control word periods 97,99 and even control word periods 96,98. Each ECM in the sections corresponding to the first and second ECM periods 100,101 of the first ECM stream 95 carry both a set of key information for obtaining a control word value associated with an odd control word period and a set of key information for obtaining a control word value associated with an even control word period. The value of the transport scrambling state control field 16 in the header 9 of each TS packet 8 having an encrypted payload 10 in a particular section of the first programme stream 92 indicates whether that section corresponds to an odd control word period or an even control word period.

The first replacement data stream section 93 is provided with a first replacement ECM stream section 103, just as the second replacement data stream section 94 is provided with a second replacement ECM stream section 104. The first replacement data stream section 93 is partitioned into sections corresponding to a first control word period 105 and a second control word period 106. Similarly, the second replacement data stream section 94 is partitioned into sections corresponding to a first control word period 107 and a second control word period 108. The first replacement ECM stream section 103 is partitioned into sections corresponding to a first ECM period 109 and a second ECM period 110. The second replacement ECM stream section 104 is also partitioned into sections corresponding to a first ECM period 111 and a second ECM period 112.

The second local head-end system 3 forms an encrypted output data stream 113 (FIG. 12), of which at least part corresponds to the first programme stream 92. To this end, sections corresponding to the first control word period 97 and second control word period 98 in the first programme stream 92 are replaced by corresponding sections forming the first control word period 107 and second control word period 108 in the second replacement data stream section 93. These sections are situated between a leading and a trailing data stream transition point $P_9, P_{10}$.

The second local head-end system provides the encrypted output data stream 113 in synchrony with an output ECM stream 114. The output ECM stream 114 is formed by forwarding the section of the first ECM stream 95 corresponding to the third ECM period 102, but suspending the forwarding of the first ECM stream 95 for the duration of the sections corresponding to the first and second ECM periods 100,101. These sections are located between leading and trailing ECM stream transition points $P_{11}, P_{12}$. Instead of forwarding the part of the first ECM stream located between the leading and trailing ECM stream transition points $P_{11}, P_{12}$, the second replacement ECM stream section 104 is forwarded.

In the illustrated embodiment, the central head-end system 1 includes first cue signal values in the cue signal provided in synchrony with the first programme stream 92. The second local head-end system is configured to respond to a first of the first cue signal values by suspending the forwarding of the first programme stream 92 from the leading transition point $P_9$ onwards. The location of the leading transition point $P_9$ coincides with or lies at a pre-determined distance from a point in the first programme stream 92 coincident with the first of the first cue signal values. Upon detecting a second one of the first cue signal values, the second local head-end system 3 resumes the forwarding of the first programme stream 92 from the trailing transition point $P_{10}$ onwards. The location of the trailing transition point $P_{10}$ coincides with or lies at a pre-determined distance from a point in the first programme stream 92 coincident with the second of the two first cue signal values.

A second cue signal value is included in the cue signal in between the two first cue signal values that signal the leading and trailing transition points $P_9, P_{10}$. That second cue signal value coincides with or lies at a pre-determined distance before a point in the first programme stream 92 coincident with the trailing ECM stream transition point $P_{12}$. The second local head-end system 3 resumes the forwarding of the first ECM stream from the trailing ECM stream transition point $P_{12}$, having first switched to the second replacement ECM stream section 104. The play-out of the second replacement ECM stream section 104 commences at the leading ECM stream transition point $P_{11}$. The location of the leading ECM stream transition point $P_{11}$ is determined on the basis of another instance of the second cue signal value, which coincides with a point in the first programme stream 92 preceding the leading transition point $P_9$. In this way, it is assured that the control word value associated with the third control word period 99 is carried in encrypted form in at least one ECM in the third ECM period 102 that is coincident with the second control word period 108 of the second replacement data stream section 108 when the encrypted output data stream 113 and the output ECM stream 114 are played out to the second receivers 6. Key cycling in the first programme stream 92 in combination with subsequent insertion of the second replacement data stream section 93 is made possible without causing interruptions in the decryption process.

The invention is not limited to the embodiments described above, but may be modified within the scope of the accompanying claims. For example, the point of insertion of the ECMs in the embodiment of FIG. 8 can be signalled also by a special cue signal value. The method of providing an encrypted data stream could also be carried out within one of the first receivers 5 or second receivers 6 on the basis of a first data stream and replacement data stream sections or second data stream received one of the first and second local head-end systems 3,4 and play-out system 4. In such an embodiment, the customised encrypted output data stream is thus generated in the same receiver as the one in which it is decrypted.

The invention claimed is:

1. A method of providing an encrypted data stream, including obtaining a first data stream with a first stream of key messages, the first data stream comprising encrypted data, partitioned into sections corresponding to key periods, each of a plurality of the key periods being associated with a respective value of a key, wherein each section corresponding to a key period associated with a value of the key includes at least one encrypted data unit decryptable using that associated key value, obtaining a pre-encrypted replacement data stream section and an associated at least one replacement key message stream section, the at least one replacement key message stream section including a key message carrying key information for obtaining key values for the replacement data stream section and at least one encrypted data unit in a section of the first stream corresponding to a certain key period, forming an encrypted output data stream and an associated stream of key messages, the forming including:

inserting the replacement data stream section into the first data stream to form the encrypted output data stream, so as to replace a corresponding part of the first data stream with a tail end of the replacement data stream section preceding the section of the first stream corresponding to the certain key period, wherein the encrypted output data stream corresponds at least partially to the first data stream; and substituting the at least one replacement key message stream section for a corresponding part of the first stream of key messages so as to coincide with a point of the encrypted output data stream preceding the tail end of the replacement data stream section, and providing as output the encrypted output data stream in synchrony with the associated stream of key messages.

2. A method according to claim 1, wherein
the obtaining the first data stream comprises obtaining the first data stream provided with the first stream of key messages in synchrony with the first data stream, such that, for each key period corresponding to a section of the first data stream, at least one key message carrying key information for obtaining the associated key value coincides with a point in the first data stream preceding the section corresponding to that key period.

3. A method according to claim 2, wherein the first data stream is obtained in synchrony with a sequence of cue signal values, wherein a location of the corresponding part of the first stream of key messages within the first stream of key messages is determined on the basis of at least one point coinciding with a first cue signal value.

4. A method according to claim 2, including obtaining the replacement data stream section synchronised with the replacement key message stream section and inserting them into the encrypted output data stream and associated stream of key messages, respectively.

5. A method according to claim 1, wherein the first data stream is obtained in synchrony with a sequence of cue signal values, the method including detecting a second cue signal value and determining at least a position of a leading end of the part of the first data stream to be replaced by the replacement data stream section on the basis of a point of coincidence of the detected second cue signal value with the first data stream.

6. A method according to claim 5, including
obtaining two candidate replacement key message stream sections, of which a first includes at least one key message carrying key information for obtaining a key value associated with an odd key period forming the certain key period, and of which a second includes at least one key message carrying key information for obtaining a key value associated with an even key period forming the certain key period,
selecting a replacement key message stream section from the two candidate replacement key message stream sections in dependence on which of two values is detected as the second cue signal value, and
forming the stream of key messages associated with the encrypted output data stream by inserting the selected replacement key message stream section.

7. A method according to claim 4, wherein the replacement key message stream section includes at least one key message carrying key information for obtaining the key value associated with the certain key period, and
wherein the obtained replacement data stream section has a tail end part encrypted such that, at least when concatenated with the part of the section of the first data stream corresponding to the certain key period, it is decryptable under the key value associated with the certain key period.

8. A method according to claim 1, wherein at least a central part of the replacement data stream section includes one or several adjoining sections corresponding to key periods, at least one of the key periods being associated with a respective value of a key, wherein each section corresponding to a key period associated with a value of the key includes at least one encrypted data unit decryptable using the associated key value and corresponds in information content, upon decryption under the associated key value, to a corresponding section of the part of the first data stream replaced by the replacement data stream section upon decryption thereof under a different key value.

9. A method according to claim 1, including
obtaining the first data stream provided with a first stream of key messages in synchrony with the first data stream, such that, for each key period corresponding to a section of the first data stream, at least one key message carrying key information for obtaining the associated key value coincides with a point in the first data stream preceding the section corresponding to that key period,
forming the stream of key messages associated with the encrypted output data stream by replacing a part of the first stream of key messages coincident with the replaced part of the first data stream,
replacing the corresponding part of the first data stream by the replacement section such that at least one key message carrying key information for obtaining a key associated with a key period following the certain key period in the first data stream coincides with a point in the at least part of the section of the first data stream corresponding to the certain key period.

10. A method according to claim 1, including
obtaining the first data stream provided with a first stream of key messages synchronised with the first data stream, such that, for each key period corresponding to a section of the first data stream, at least one key message carrying key information for obtaining the associated key value coincides with a point in the first data stream preceding the section corresponding to that key period,
obtaining the replacement data stream section synchronised to coincide with a replacement key message stream section,
forming the encrypted output data stream and its associated stream of key messages by substituting the replacement data stream section and coincident data stream section for the corresponding part of the first data stream and coincident part of the first stream of key messages, respectively, such that an encrypted leading end part of the replacement data stream section is decryptable, at least when concatenated with a part from the first data stream terminated at a transition point upon which the replacement data stream section follows in the encrypted output data stream, under a key value for which key information is carried in at least a last key message in the first key message stream that is coincident with a point preceding the transition point.

11. A method according to claim 10, wherein the part from the first data stream terminated at the transition point and the leading end part of the replacement data stream section are decryptable under the same key value, at least when concatenated.

12. A method according to claim 1, including
obtaining the first data stream provided with a first stream of key messages synchronised with the first data stream, such that, for each key period corresponding to a section of the first data stream, at least one key message carrying key information for obtaining the associated key value coincides with a point in the first data stream preceding the section corresponding to that key period,
wherein the part of the first data stream replaced by the replacement data stream section commences at a transition point and at least a last of the first stream of key messages coinciding with a point preceding the transition point carries key information for obtaining the key value associated with the certain key period, further including forming the stream of key messages associated with the encrypted output data stream by removing from the first stream of key messages all key messages coinciding with the part of the first data stream replaced by the replacement data stream section.

13. A method according to claim 1, including obtaining the first data stream provided with a first stream of key messages synchronised with the first data stream, such that, for each key period corresponding to a section of the first data stream, at least one key message carrying key information for obtaining the associated key value coincides with a point in the first data stream preceding the section corresponding to that key period, wherein the part of the first data stream replaced by the replacement data stream section commences at a transition point and wherein a further part of the section of the first data stream corresponding to the certain key period precedes the transition point.

14. A computer program including a set of instructions capable, when incorporated in a non-transitory machine readable medium, of causing a system having information processing capabilities to perform a method according to claim 1.

15. A method according to claim 1, wherein the replacement key message comprises key values associated with two key periods of the plurality of key periods.

16. System for providing an encrypted data stream, the system comprising:

means for obtaining a first data stream with a first stream of key messages, the first data stream comprising encrypted data, partitioned into sections corresponding to key periods, each of a plurality of the key periods being associated with a respective value of a key, wherein each section corresponding to a key period associated with a value of the key includes at least one encrypted data unit decryptable using that associated key value, means for obtaining a pre-encrypted replacement data stream section and an associated at least one replacement key message stream section, the at least one replacement key message stream section including a key message carrying key information for obtaining key values for the replacement data stream section and at least one encrypted data unit in a section of the first stream corresponding to a certain key period, means for forming an encrypted output data stream and an associated stream of key messages, the means for forming including:

means for inserting the replacement data stream section into the first data stream to form the encrypted output data stream, so as to replace a corresponding part of the first data stream with a tail end of the replacement data stream section preceding the at least part of the section of the first stream corresponding to the certain key period, wherein the encrypted output data stream corresponds at least partially to the first data stream, and means for substituting the at least one replacement key message stream section for a corresponding part of the first stream of key messages so as to coincide with a point of the encrypted output data stream preceding the tail end of the replacement data stream section, and means for providing as output the encrypted output data stream in synchrony with the associated stream of key messages.

17. System according to claim 16, including a receiver for receiving the first data stream from a central head-end system through a first data link and a system for broadcasting the encrypted output data stream in synchrony with the associated stream of key messages to a plurality of receivers through a broadcast network.

18. Server, comprising means for providing an encrypted output data stream in synchrony with an associated stream of key messages in response to a request from a client system connected to the server through a network, wherein the server is configured to play out from a storage system an encrypted data stream and associated stream of key messages obtainable by:

obtaining a first data stream with a first stream of key messages, the first data stream comprising encrypted data, partitioned into sections corresponding to key periods, each of a plurality of the key periods being associated with a respective value of a key, wherein each section corresponding to a key period associated with a value of the key includes at least one encrypted data unit decryptable using that associated key value, obtaining a pre-encrypted replacement data stream section and an associated at least one replacement key message stream section, the at least one replacement key message stream section including a key message carrying key information for obtaining key values for the replacement data stream section and at least one encrypted data unit in a section of the first stream corresponding to a certain key period, forming an encrypted output data stream and an associated stream of key messages, the forming including:

inserting the replacement data stream section into the first data stream to form the encrypted output data stream, so as to replace a corresponding part of the first data stream with a tail end of the replacement data stream section preceding the at least part of the section of the first stream corresponding to the certain key period, wherein the encrypted output data stream corresponds at least partially to the first data stream; and substituting the at least one replacement key message stream section for a corresponding part of the first stream of key messages so as to coincide with a point of the encrypted output data stream preceding the tail end of the replacement data stream section, and providing as output the encrypted output data stream in synchrony with the associated stream of key messages.

19. A method of providing pre-encrypted data for assembly into a customised data stream, including providing a first data stream comprising encrypted data, partitioned into sections corresponding to key periods, each of a plurality of the key periods being associated with a respective value of a key, wherein each section corresponding to a key period associated with a value of the key includes at least one encrypted data unit decryptable using that associated key value, providing a first stream of key messages, at least some of which carry key information for obtaining at least one of the key values, synchronised with the first data stream, and providing a pre-encrypted replacement data stream section for inserting into the first data stream so as to replace a corresponding part of the first data stream between a leading transition point and a trailing transition point, such that at least part of a section of the first data stream corresponding to a certain key period follows upon the trailing transition point, and providing a replacement key message stream section associated with the replacement data stream section, for replacing a part of the first stream of key messages coinciding with the part of the first data stream between the leading and trailing transition points, the replacement key message stream section including a key message carrying key information for obtaining key values for the replacement data stream section and at least one encrypted data unit in the section of the first stream corresponding to the certain key period.

20. A method according to claim 19, wherein the first stream of key messages is constructed such that, for each section of the first data stream corresponding to a key period, at least one key message carrying key information for obtaining the key value associated with that key period is played out at a point coinciding with a point in the first data stream preceding that section of the first data stream.

21. A method according to claim 20, wherein each replacement data stream section includes an encrypted leading end part, decryptable under a key value associated with a key period corresponding to a section of the first data stream including a part immediately preceding the leading transition point, at least when concatenated with that part of the first data stream.

22. A method according to claim 20, wherein each replacement data stream section includes an encrypted leading end part decryptable under a key value associated with a key period corresponding to a section of the first data stream of which at least a part commences at the leading transition point.

23. A method according to claim 19, wherein each replacement data stream section is provided with at least a central part including at least one encrypted section decryptable only under a different key value than a corresponding section of the first data stream between the leading and trailing transition points.

24. A method according to claim 19, wherein each replacement data stream section is partitioned into a plurality of sections corresponding to key periods, wherein at least some of the sections corresponding to key periods include at least one data unit decryptable only under a key value uniquely associated with the key period to which the section corresponds.

25. A method according to claim 24, wherein each replacement data stream section is provided with an associated replacement key message stream section synchronised with it and constructed that, at least for each section of the replacement data stream section following a leading end part of the replacement data stream section and corresponding to a key period with which a key value is associated, the replacement key message stream section includes at least one key message carrying key information for obtaining the associated key value that is coincident with a point of the replacement data stream section preceding that section of the replacement data stream section.

26. A method according to claim 19, wherein each replacement data stream section includes an encrypted trailing end part, decryptable, at least when concatenated with at least a part of a section of the first data stream corresponding to a certain key period and following immediately upon the trailing transition point, under the key value associated with the certain key period.

27. A method according to claim 19, wherein both the part of the first data stream between the leading and trailing transition points and at least one of the replacement data stream sections is provided with at least one embedded watermark unique to the first data stream and replacement data stream section concerned, respectively.

28. A method according to claim 19, wherein at least the part of the first data stream between the leading and trailing transition points and each replacement data stream section are obtained by encrypting a clear data stream section using at least one of a different cipher and different key values for each replacement data stream section.

29. A method according to claim 19, wherein the key periods associated with a key value each constitute one of alternating odd and even key periods, wherein each data unit decryptable using a key value associated with an odd key period is provided with a first identifier and each data unit decryptable using a key value associated with an even key period is provided with a second identifier, different from the first identifier, wherein in the key messages, each set of key information for obtaining a key value is provided with an identifier corresponding to one of the first and second identifiers.

30. A method according to claim 29, including
providing at least one cue signal in synchrony with the first data stream,
wherein a first cue signal value is used to indicate a location in the first data stream associated with the leading transition point,
providing two candidate replacement key message stream sections, of which a first includes at least one key message carrying key information for obtaining a key value associated with an odd key period forming the certain key period, and of which a second includes at least one key message carrying key information for obtaining a key value associated with an even key period forming the certain key period,
choosing the first cue signal value from two values in dependence on the certain key period corresponding to an odd or an even key period.

31. A method of providing pre-encrypted data from a central server to a local server for assembly into a customised data stream, including
providing a first data stream comprising encrypted data, partitioned into sections corresponding to key periods, each of a plurality of the key periods being associated with a respective value of a key,
wherein each section corresponding to a key period associated with a value of the key includes at least one encrypted data unit decryptable using that associated key value,
providing a first stream of key messages, at least some of which carry key information for obtaining at least one of the key values,
wherein the first stream of key messages is synchronised with the first data stream,
providing at least one cue signal in synchrony with the first data stream, wherein two first cue signal values signal a leading transition point and a trailing transition point in the first stream, the local server being arranged to respond to the cue signal values by inserting a pre-encrypted replacement data stream into the first data stream so as to replace a part of the first stream between the leading and trailing transition points with a replacement data stream section and to play out a resultant data stream in synchrony with forwarded parts of the first stream of key messages, the forwarding being interrupted for the duration of at least a first part of the replacement data stream section,
wherein a second cue signal value is provided between the two first cue signal values, the local server being arranged to resume the forwarding of the first stream of key messages in response to the second cue signal value.

32. A central head-end system for providing pre-encrypted data for assembly into a customised data stream, the system comprising:

means for providing a first data stream comprising encrypted data, partitioned into sections corresponding to key periods, each of a plurality of the key periods being associated with a respective value of a key, wherein each section corresponding to a key period associated with a value of the key includes at least one encrypted data unit decryptable using that associated key value, means for providing a first stream of key messages, at least some of which carry key information for obtaining at least one of the key values, synchronised with the first data stream, means for providing a pre-encrypted replacement data stream section for inserting into the first data stream so as to replace a corresponding part of the first data stream between a leading transition point and a trailing transition point, such that at least part of a section of the first data stream corresponding to a certain key period follows upon the trailing transition point, means for providing a replacement key message stream section associated with the replacement data stream section, for replacing a part of the first stream of key messages coinciding with the part of the first data stream between the leading and trailing transition points, the replacement key message stream section including a key message carrying key information for obtaining key values for the replacement data stream section and at least one encrypted data unit in the section of the first stream corresponding to the certain key period.

* * * * *